(12) United States Patent
Madan et al.

(10) Patent No.: US 11,934,279 B2
(45) Date of Patent: Mar. 19, 2024

(54) SEQUENTIAL FILE RESTORE PERFORMANCE USING FILESYSTEM REDIRECTION

(71) Applicant: Dell Products L.P., Round Rock, TX (US)

(72) Inventors: Nitin Madan, Cupertino, CA (US); Kedar Godbole, Pune (IN)

(73) Assignee: Dell Products L.P., Hopkinton, MA (US)

( * ) Notice: Subject to any disclaimer, the term of this patent is extended or adjusted under 35 U.S.C. 154(b) by 45 days.

(21) Appl. No.: 17/512,147

(22) Filed: Oct. 27, 2021

(65) Prior Publication Data

US 2023/0128279 A1     Apr. 27, 2023

(51) Int. Cl.
  *G06F 16/10*   (2019.01)
  *G06F 11/14*   (2006.01)
  *G06F 16/13*   (2019.01)
  *G06F 16/172*  (2019.01)

(52) U.S. Cl.
  CPC ...... *G06F 11/1469* (2013.01); *G06F 11/1453* (2013.01); *G06F 16/13* (2019.01); *G06F 16/172* (2019.01); *G06F 2201/84* (2013.01)

(58) Field of Classification Search
  None
  See application file for complete search history.

(56) References Cited

U.S. PATENT DOCUMENTS

| | | | |
|---|---|---|---|
| 2007/0032887 A1* | 2/2007 | Muroi | G06Q 10/06 700/86 |
| 2011/0072234 A1* | 3/2011 | Chinya | G06F 12/1036 711/E12.001 |
| 2013/0144840 A1* | 6/2013 | Anglin | G06F 11/1469 707/640 |
| 2020/0333971 A1* | 10/2020 | Madan | G06F 3/0673 |
| 2020/0342129 A1* | 10/2020 | Chaiken | G06F 21/44 |

* cited by examiner

*Primary Examiner* — Jau Shya Meng
(74) *Attorney, Agent, or Firm* — Staniford Tomita LLP (57) ABSTRACT

A prefetch mechanism stores data in the memory allocated in a remote passive (remote) node in a High Availability active-passive node pair. A read-ahead cache that can host different parts of a file is created on both the active and the passive nodes. The system improves the performance of sequential restores by using memory available on a passive node to supplement the local (active node) memory to hold the prefetched data for the common case of large sequential restores. This extra memory overcomes issues when a current prefetch fails to keep up with the target restore performance. Filesystem redirection is thus accomplished by servicing an I/O request by sending it another node that itself caches the data.

10 Claims, 6 Drawing Sheets

| Start Offset | End Offset | Location | Page Id |
|---|---|---|---|
| 100 MB | 101MB | Local | 120 |
| 200 MB | 201 MB | Remote | 203 |

SEQUENTIAL FILE RESTORE PERFORMANCE USING FILESYSTEM REDIRECTION

TECHNICAL FIELD

Embodiments relate generally to deduplication storage systems, and more particularly to improving file restores using filesystem redirection.

BACKGROUND OF THE INVENTION

Data is typically backed up by copying the data from a data source to a data target or storage device or network (destination). Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Data restores involve moving stored data from the storage target back to the data source or active tier after a data loss event on the data source. In a typical filesystem, the restore operations are aided by a read-ahead (prefetch) mechanism. The simplest form of prefetching is a read hint issued at a certain horizon from the read offset. A single read request typically issues a single prefetch request at an offset calculated from the read offset and prefetch horizon. As an example, if the read comes in at an offset 0 MB, the prefetch request is issued at the 0 MB plus the prefetch horizon MB. Typically, the prefetch horizon is on the order of a few megabytes (MB) in size. It is higher in the scenarios where the underlying storage layer is slower. This mechanism generally works well since the application read requests find most all of their data already present in the read-ahead cache, and therefore need not block for I/O operations, thus considerably improving read performance.

Since the read operations are copying data out from memory while the prefetches are doing the actual work of reading from the storage layer, the reads periodically catch up with the prefetches. Such read requests block I/Os until the data becomes available, but during this time the prefetches that have been issued out already by the previous reads get time to perform their I/O operations and load data into memory. This ensures that the subsequent read requests do not block I/Os until a read catches up again with the prefetch. This cycle continues throughout the restore of a file, and since most of the reads are getting served out of memory, throughput improvement is significant.

As mentioned above, prefetches at the prefetch horizon bring data into memory, just as application reads are catching up. In most present systems, application reads typically catch up often enough because the disk I/O is slow, and because, and as the age of a file increases, the locality of data in the file decreases. This is especially true for deduplication filesystems. It has been found that file restore performance is directly proportional to the length of the read highway, where the read highway is the time spent between stalls of I/Os being read out of memory and read off the disk, (i.e., fast reads versus slow reads).

What is needed, therefore, is a prefetch process that keeps the read highways long in order to improve file restore performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
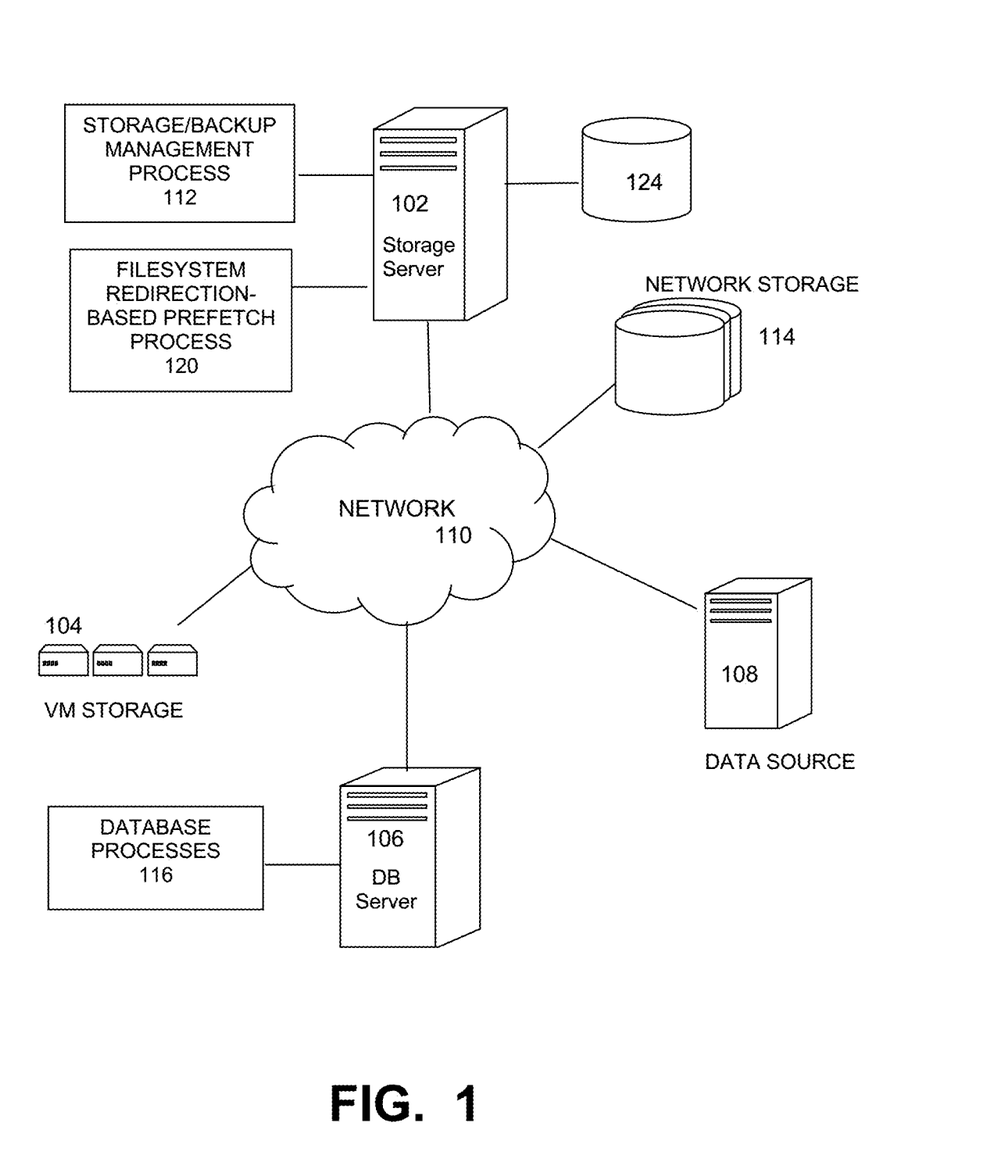
FIG. 1 is a diagram of a computing network implementing a filesystem redirection-based prefetch process in a deduplication storage system, under some embodiments.

Embodiments are described for a process for improving file restore times in deduplication backup systems. FIG. 1 illustrates a computer network system that implements one or more embodiments of a data processing and storage network system implementing a filesystem redirection-based file restoration process, under some embodiments. This filesystem redirection is accomplished by servicing the application I/O request by sending the request to another node that itself caches the data (i.e., the passive node). Memory on the other node thus supplements memory on the local node for use as a read-ahead cache.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

In a Merkle tree, the data chunks directly written to disk are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container. A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$ data.

Figure 2:
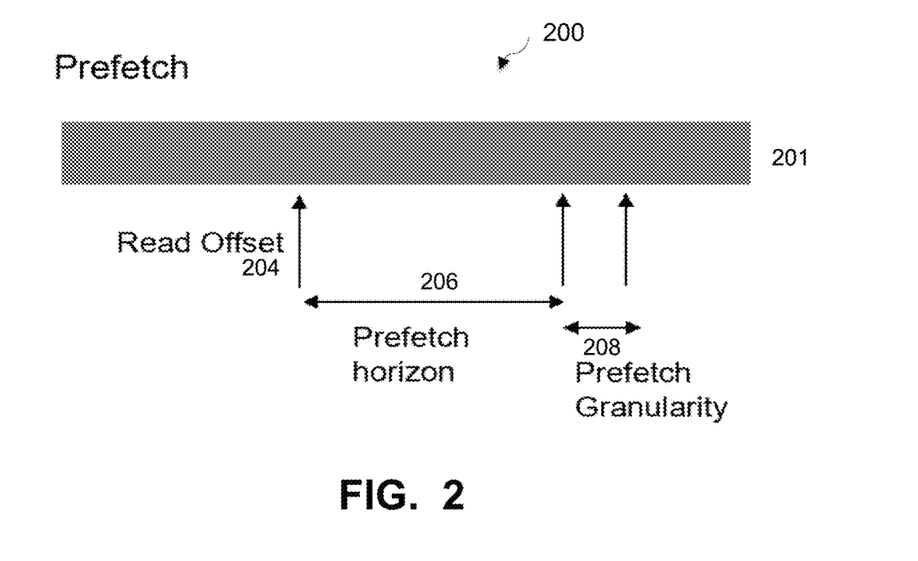
FIG. 2 illustrates a prefetch process that is adopted for use with a filesystem redirection-based prefetch process, under some embodiments.

As mentioned in the background section above, in a typical filesystem (e.g., DDFS), data restores are aided by a read-ahead (prefetch) mechanism, such as a read hint issued at a certain horizon from the read offset. A single read request typically issues a single prefetch request at an offset calculated from the read offset and a set prefetch horizon. FIG. 2 illustrates a prefetch process that is adopted for use with a filesystem redirection-based prefetch process to improve file restores, under some embodiments. FIG. 2 shows certain pre-fetch parameters defined for a horizontal axis 201 denoting memory capacity in megabytes (MB), or any similar unit of storage). As shown in FIG. 2, a prefetch request issues at a point after an application's read request as defined by a read offset 204 and a prefetch horizon 206. As shown in the example scenario of diagram 200, a read comes in at a read offset 0 MB, and a prefetch request is issued at the 0 MB plus the prefetch horizon value in MB. Typically, the prefetch horizon 206 is on the order of 30 MB or so (e.g., between 15 to 50 MB), and is higher when the underlying storage layer is slower, although any value is possible.

The prefetch granularity 208 shown in the example of FIG. 2 is on the order of 1 MB for a prefetch horizon of 30 MB. The prefetch granularity is the size of the prefetch I/O operation. In large sequential reads, it is typically 1 MB for one example, though other sizes are also possible. Likewise, the read offset 204 is typically 0, but can be any other practical value.

The prefetching operation 200 can be for any file or data restore process that comprises an application issuing a file open request followed by a plurality of read and write requests and a file close. In this context, the prefetch 200 moves data from a prefetched file into a read-ahead cache to be sent to a read request consumer of the filesystem. Any similar operation that uses a prefetch mechanism as a hint to indicate upcoming reads may also be used.

Without the benefit of a prefetch process 200, each read request becomes a blocking read (i.e., block pending I/O operations), and is limited by the backend storage performance, thus at least some degree of data prefetching is usually desired to reduce I/O blocking and improve file restore performance.

As read operations copy data out from memory, the prefetches 200 do the actual work of reading data from the storage layer. As the reads periodically catch up with the prefetches, these reads block I/Os until the data becomes available. During this time, however, the prefetches that have been issued out already by the previous reads get time to perform their I/Os and load data into memory. This ensures that the subsequent read requests do not block I/Os until a read again catches up with the prefetch. This cycle continues throughout the restoration of a file, and since most of the reads are getting served out of memory, throughput improvement is significant at least in the case of relatively long 'read highways.'

Figure 3:
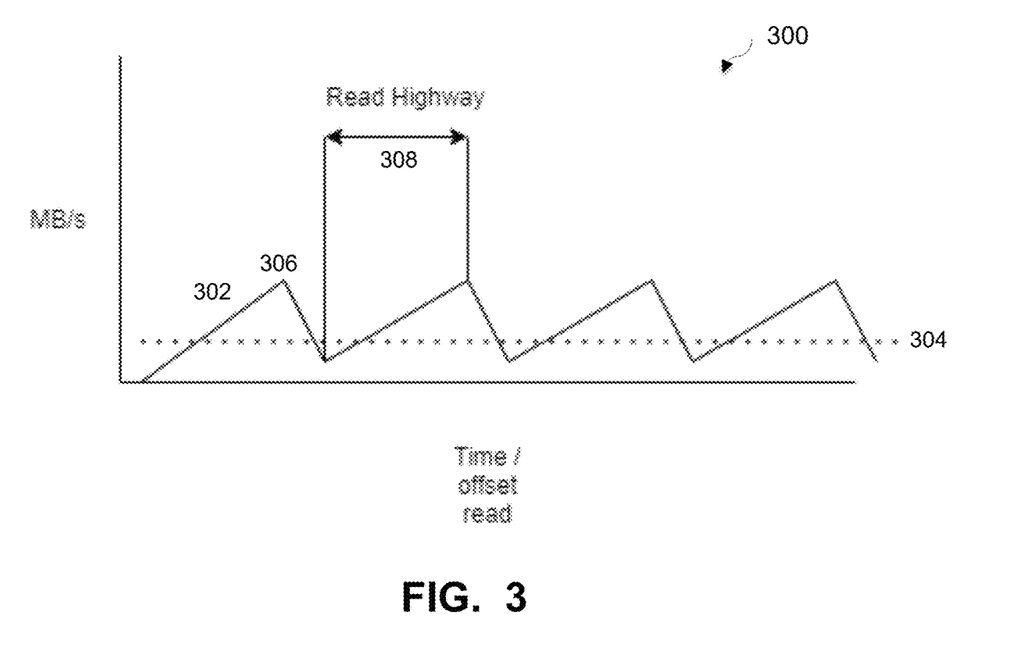
FIG. 3 illustrates an example plot of a read highway formed by slow and fast reads in a data restore system.

As mentioned in the Background, prefetches at the prefetch horizon bring data into memory just as application reads catch up, which happens frequently due to slow disk I/O, and other factors. FIG. 3 illustrates an example plot of slow and fast reads for a system that accesses both fast memory and slow disks. FIG. 3 illustrates a graph 300 over a Y-axis measuring data transfer throughput in MB/s, and an X-axis measuring Time/offset read. The dimensions of graph 300 demonstrate that sequential read requests come to the ordered increased offsets for the file, i.e., the file is being read from offset 0 till the end of the file. This is also happening with a monotonically increasing clock.

As shown in FIG. 3, the graph between I/O being read out of memory and read off the disk (i.e., fast reads versus slow reads) appears as a sawtooth pattern plot 302. As a result, the average read performance (304) is a fraction of the peak read performance 306. Here, the distance between the time spent between the stalls is defined as a read highway 308. The system's restore performance is directly proportional to the length of the read highway, and the key to good sequential read performance is to keep the read highways as long as possible.

A prefetch by its nature is a hint to the filesystem. This hint is provided so that the lower layers of the filesystem stack can read-ahead the portion of the file in memory. By its nature, there is no binding associated with the hint. An application can choose to not read the prefetched data. Conversely, the filesystem if it chooses to, can free up the prefetched data. This is usually done by a process called 'memory reclaimer' to make space for something else. Prefetching thus works optimally only for a limited amount of prefetch horizon 206. A system with enough memory for all cases could read ahead the entire file in memory, and a read I/O would never hit the disk, however this scenario is unrealistic at best.

In present systems, the disk latency for a region read is about 10 ms. Most reads to the filesystem (DDFS) are between 256 KB to 1 MB per I/O operation, and they typically require several disk I/Os to service them. The read latency without prefetching would be on the order of 200 ms to 1 second because of serialization and queue build ups. There are two conflicting requirements in this scenario. The first requirement is to improve restore performance by prefetching as much data as possible to thereby use as much cache memory as possible. The second requirement, which is in opposition to the first, is to create and maintain free space in the cache by evicting data from the cache. The eviction pressure prevents accumulating too much data in the cache, thereby limiting the improvement in restore performance.

Embodiments of the filesystem redirection-based prefetch process 120 help overcome these limitations by implementing certain mechanisms that effectively lengthen the read highways to optimize file restores in High Availability (HA) and other similar system.

High Availability system configurations typically have two controller boxes connected by a fast interconnection. These controller boxes typically share metadata over the fast interconnects and a shared storage array hosts the data. On a failover, the node taking over uses the metadata that was mirrored and the shared storage to serve the client requests.

Figure 4:
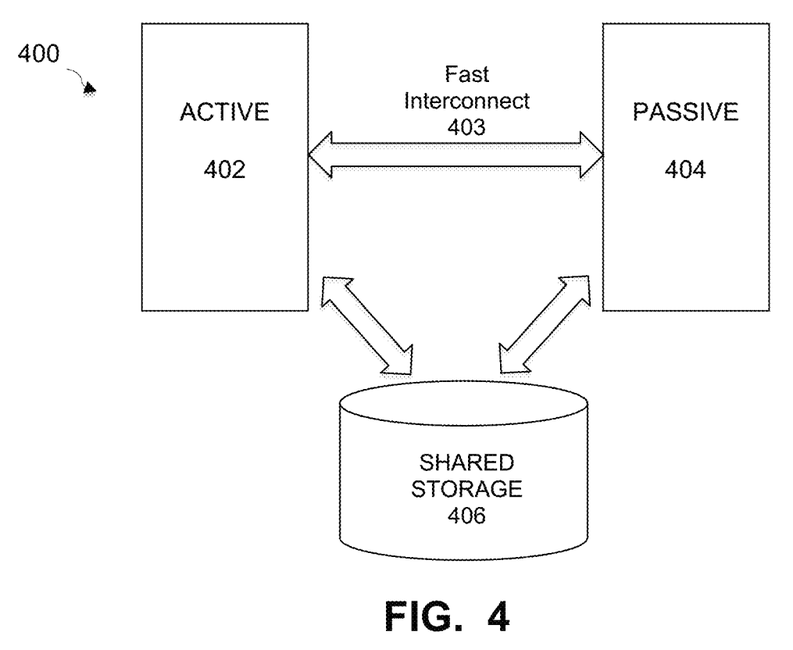
FIG. 4 is an example High Availability system that implements a filesystem redirection-based prefetch process, under some embodiments.

FIG. 4 is an example High Availability system that implements a filesystem redirection-based prefetch process, under some embodiments. System 400 of FIG. 4 includes an active node 402 and a passive mode 404 connected to each other through a fast interconnect link 403, and each connected to a shared storage device or array 406. In the active-to-passive HA environment of FIG. 4, the passive controller is in the standby mode, in contrast to an active-to-active mode that has both nodes in active usage and a standby service running on both nodes. Such a system is offered in systems such as Power Protect Data Domain offers an active-passive host adapter (HA), which has two controllers and a shared storage, as shown in FIG. 4. The controller hosting the passive node 404 is identical to the controller hosting the active node 402. This is hosting the passive service and is ready to take over as needed, and has a lot of resources that are available to be used. For purposes of the present description, the active node 402 may also be represented or referred to as the 'local' node; and the passive node 404 may also be represented or referred to as the 'remote' node, such as for a system that includes separate networked devices as in clustered or multi-node networks.

As shown in FIG. 4, the interface between the active and passive nodes is over a high-speed or high performance interconnect or link. In the case of Data Domain High Availability systems, the controller nodes are connected with a 10 GB link which has microsecond latencies. Other similar network links can also be used. For example, another example would be Mellanox's RDMA-capable Infiniband network, and similar networks.

Embodiments of system 100 including process 120 include a system and method to prefetch and cache data using the available resources on the passive node 404, thus overcoming the limitations of the cache size and cache eviction pressure on the single active node 402. Furthermore, process 120 provides a mechanism to use filesystem redirection to read the cached data off the passive node, making this process completely transparent to the application. The process uses the memory and resources available on the passive node in an efficient manner while keeping the mechanisms transparent to the application. Embodiments of process 120 use the memory on the HA passive node 404 as an opportunistic read ahead cache to solve the restore bottlenecks associated with single streams or low streams. Such embodiments correspond to or utilizes certain advanced parallel read ahead methods, such as multi stream restore (MSR).

In an embodiment, the file restore process is implemented using a Multi-Streamed Restore (MSR) process. One implementation of MSR is a DDFS feature that was added to physical Data Domain devices, and is an example of a feature that opens up multiple internal streams for each external read stream and uses a read ahead cache to serve the user I/Os. MSR works for sequential reads of large files (e.g. larger then 8 GB) and after a minimum amount of data has been read (e.g., 500 MB), MSR is invoked to open a number of parallel read threads depending on hardware configurations, such four to eight threads. MSR speeds up read loads for larger files so that if the backup application uses a single stream to read from a file, the DD internally reads the file by using several threads in parallel, thereby returning the data to the backup application than possible using only a sequential process.

Present MSR systems are limited by memory availability, where the total memory consumed by MSR equals the number of MSR streams multiplied by the memory consumed per MSR stream. Embodiments extend the MSR process to utilize memory beyond that may be locally available by tapping memory available on one or more remote devices. This allows process 120 to provide certain benefits to system 100, including providing a larger read ahead cache thus producing longer read runways, and increased parallelism, which avoids longer queues (and queue delays) in the bottom layers.

Embodiments include a prefetch mechanism that stores data in the memory allocated in the remote (passive) node. The process creates a read-ahead cache on both the active and the passive nodes, and these caches could host different parts of the file. As such, the system 100 is configured to improve sequential restores by using memory available on a passive node of an HA active-passive node pair to supplement the local (active node) memory to hold the prefetched data for the common case of large sequential restores. This extra memory use overcomes issues when a current prefetch fails to keep up with the target restore performance. A fast interconnect is provided between the active-passive pair to ensure the restore performance.

Although embodiments are described with respect to high availability (HA) systems, it should be noted that embodiments are not so limited and can be implemented on any system with separate computing nodes that are linked via a high performance interconnect in a data storage network used by a data backup and restore system.

Figure 5:
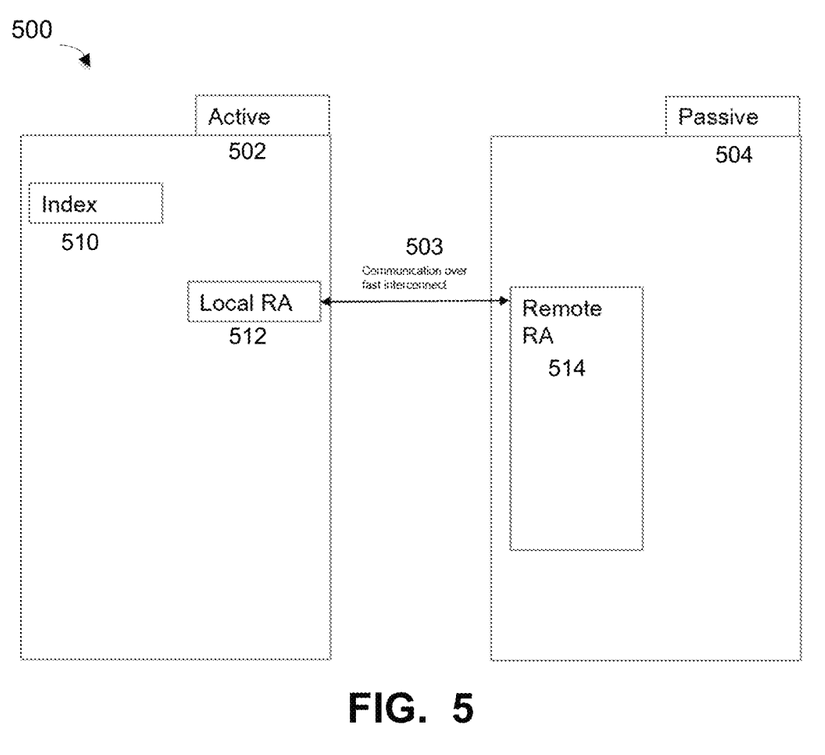
FIG. 5 is a block diagram illustrating a system for performing a file-system redirection-based prefetch, under some embodiments.

FIG. 5 is a block diagram illustrating a system for performing a file-system redirection-based prefetch, under some embodiments. As shown in system 500, an active node 502 is coupled to a passive node 504 over a fast interconnect link 503. The active node has a local read-ahead (RA) cache (local RA) 512. A remote read-ahead cache (remote RA) 514 is created in the passive node 504. Each of the local RA and remote RA are a pool of pages that are uniquely addressable.

These RA caches can be created and initialized during an initiation or setup phase of process 120, and at this stage, the caches are empty (i.e., no content).

The remote read-ahead cache 514 is the memory allocated from the remote (passive) system 504, and effectively increases the available memory for the entire read-ahead cache that is built on the local memory associated with the local read-ahead cache 512. This distributed, extended memory technique requires an index that holds the relationships of the file offsets to the appropriate memory. For the embodiment of FIG. 5, an index 510 is included within the active node 502. The index 510 can be embodied as an index hash table (index HT) that is used to track the location of a chunk of a file that is being read. During system setup and upon creation, the index 510 is also initially empty.

Pages are typically used to track the memory pool in filesystems, such as the filesystem used in system 100. The index 510 is configured to hold the relationship of the file offset to the page number for each file being read. The index also indicates whether or not the page is local or remote. A bit flag or data element can be used to signal this local/remote condition.

As stated above, a second feature of process 120 is keeping the resource sharing process transparent to the application. In an embodiment, a filesystem redirection mechanism is used to accomplish this task. For this feature, filesystem redirection is effectively accomplished by servicing the application I/O request by sending the request to another node that itself caches the data (i.e., the passive node). This embodiment uses the additional or different node memory to supplement the read-ahead cache on a local node. In this case, the use of the remote RA 514 on the passive node 504 to supplement the local RA 512 on the local active node 502.

In another embodiment, the system could be configured, to bring in the data from the passive node to the active node as a read-ahead. In this case the application I/O will find most of the application requests served out of the local read ahead cache.

As described above, since the index 510 knows where the page is, the read request can be serviced by the read ahead cache service at either of the nodes 502 or 504. This operation imposes a certain cost of setup depending on system constraints, and therefore should be deployed only when and where it would be useful. For example, if the file which is being restored is small, or if the access pattern is not sequential, this approach is not worth the cost and effort to set up. Therefore, embodiments work best with backup restores that comprises long, sequential reads. Furthermore, the system can be configured to listen into application hints to determine smaller file level restore versus the long sequential restore.

Once it has been determined that the access pattern being read comprises restores, the next step is to allocate the read ahead caches from active and passive node memory. Embodiments do not limit this cache to be a per-file cache. For example, embodiments include a much larger read ahead memory (e.g., some local and the rest on the remote node). As an embodiment, the local storage something on the order of 64 to 128 MB, per stream, while the remote node could be used to host an order of magnitude larger (512 MB to 2 GB) per stream data.

In an embodiment, process 120 continues to divide the memory on each node into 1 MB pages. As these pages are used up by the file, the corresponding offset-to-page information is kept in index 510. As shown, this index is kept local in the active node 502, and an index lookup returns the location of the page being requested if the read data has been previously indexed.

Figure 6:
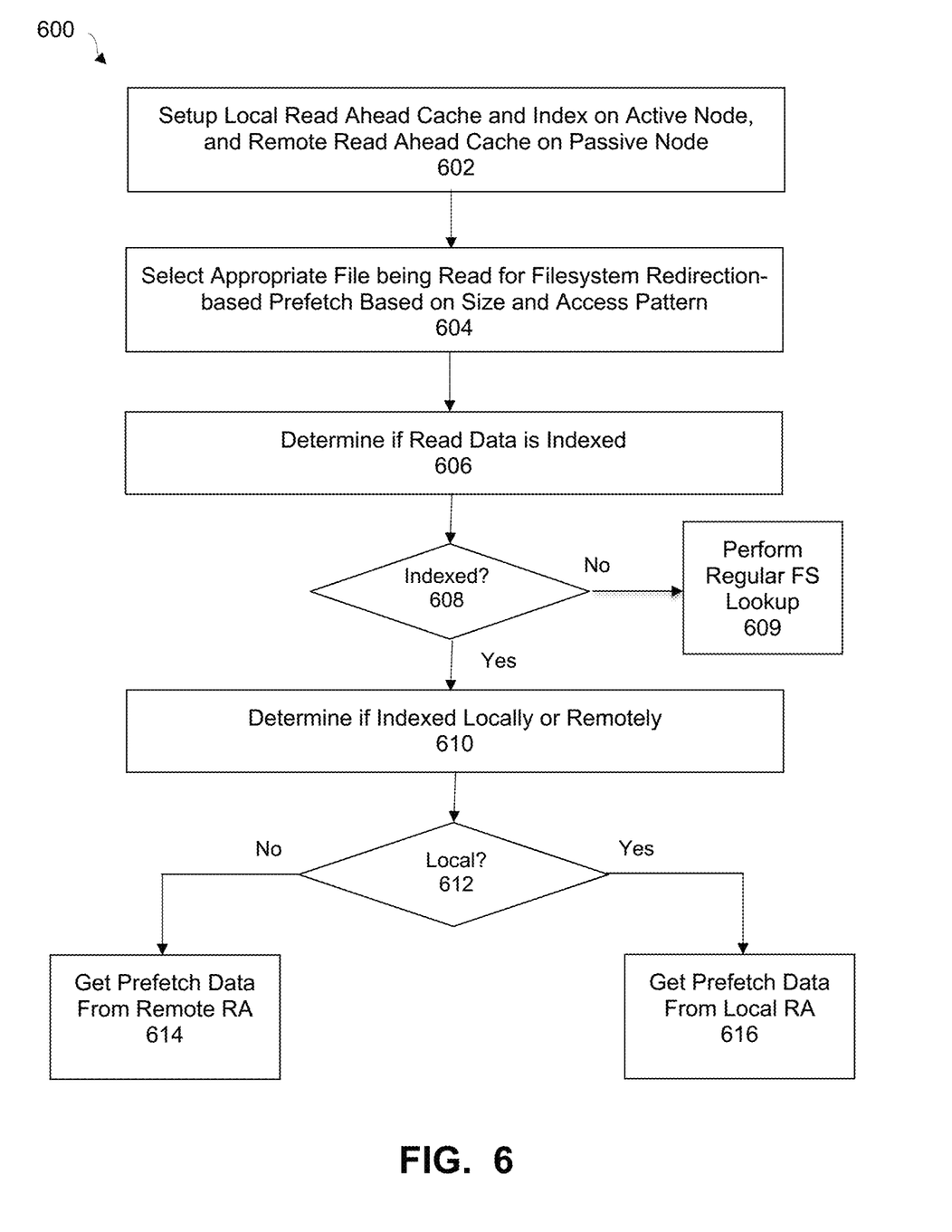
FIG. 6 is a flowchart that illustrates a method of performing a file-system redirection-based prefetch, under some embodiments.

FIG. 6 is a flowchart that illustrates a method of performing a file-system redirection-based prefetch, under some embodiments. Process 600 begins with setup of the local read-ahead cache 512 and index 510 on the local (active) node, and the remote read-ahead cache 514 on the remote (passive) node, 602.

As a file is being read, the system determines whether or not it is a candidate for the filesystem redirection-based prefetch and restore technique. As mentioned above, selection of appropriate files for process 120 is based on the file size and the access pattern. Large files that are being restored sequentially are good candidates for using the technique of process 120. Thus, any file that is of a size less than a defined size threshold and/or exhibits a non-optimal access pattern is processed using a normal pre-fetch process, and selected files are processed accordingly, 604.

In an embodiment, an intelligent load measure process is used, such as by an MSR operation, to check for certain preconditions to further process a file. In an embodiment, these pre-conditions comprise: (1) a size above a certain minimum size threshold, and (2) a sequential (rather than random) access pattern over a certain number of segments. Other preconditions may also be used depending on system configuration and constraints. This MSR process can also be configured to monitor the characteristics of the incoming read requests to periodically pre-check the reads to ensure that only sufficiently large and sequential files are correspondingly processed for prefetches. If any of the conditions become false, the prefetch process 120 can then suspend itself to save system resources.

For files that are selected for further processing, the filesystem redirection process then determines if the read data has been previously indexed, 608. If not, the file data is retrieved using a regular filesystem lookup 609. If the read data has been indexed, the process next determines from the index whether it is indexed locally (on the active node) or remotely (on the passive node), 610. If it is indexed locally, 612, the prefetch data is retrieved from the local read-ahead cache, 616; and if is indexed remotely, the prefetch data is retrieved from the remote read-ahead cache, 614.

Figure 7:
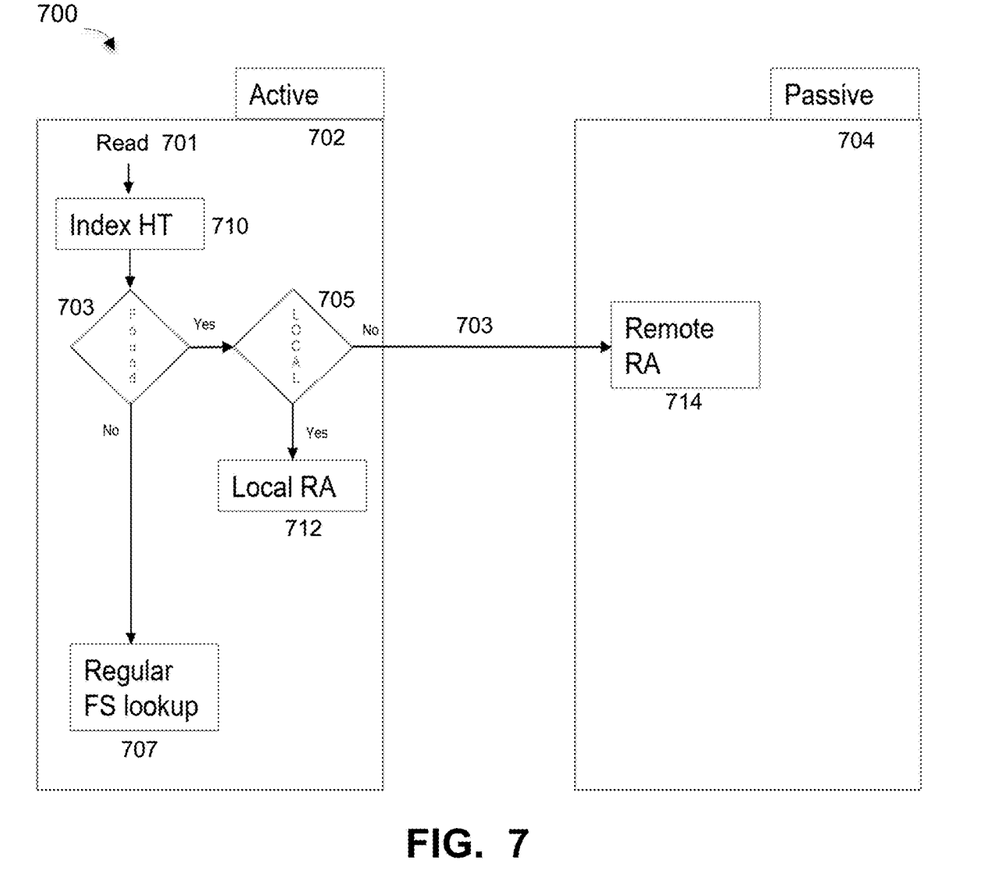
FIG. 7 illustrates the use of read-ahead caches on both an active and passive node, under some embodiments.

FIG. 7 illustrates the use of read-ahead caches on both an active and passive node, under some embodiments. As shown in diagram 700, a read 701 is received in the active node 702 and is input to the index hash table (HT) 710. If the read data is not found in the index HT, as determined in decision block 703, the process performs a regular filesystem lookup 707. If, however, the read data has been indexed, it is next determined 705 whether it is indexed locally or remotely. If local, the read data is prefetched from the local read-ahead cache 712. If instead it is indexed remotely, it is retrieved over the fast interconnect link 703 from the remote read-ahead cache 714 in the passive node 704.

Further explanation is provided by way of an example embodiment in which the local cache 712 is of size 128 MB and the remote cache 714 is of size 256 MB. In this example, the file has just started to be read by read operation 701 so the cursor is at offset 0. In a typical filesystem environment, the I/O will be issued for 0 MB to 1 MB, and a prefetch I/O will be issued at the prefetch horizon (e.g., 16 MB) for 1 MB.

For this example, the system issues the I/O for 0 MB to 1 MB, and issues out a read at 16 MB onwards. In an embodiment, the system actually issues reads for 16 MB to 144 MB (the local RA cache is 128 MB) to be retrieved from the local RA cache. Furthermore, read I/Os from 144 MB to 400 MB (where the remote RA cache is 256 MB) will be issued, and these will be resident in the remote RA cache. It should be noted that this system is not calling the I/Os at offsets 16 MB onwards as prefetch requests but as read instructions. As the reads are completed by the underlying storage systems, the data for these reads will be inserted into the read ahead cache. The index is also updated to reflect the pages which are in the cache. Any read request for the offsets will be served by this cache.

Figure 8:
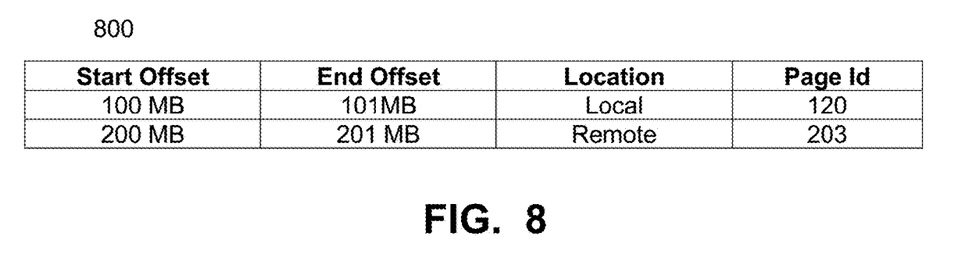
FIG. 8 illustrates an index for an example embodiment in which there is a read for certain offset.

FIG. 8 illustrates an example embodiment in which there is a read for offset 100 MB (for 1 MB). The index in this case would appear as shown in the Table 800 of FIG. 8. For this example, the index is a hash table, indexed by the offset, so that any I/O request between 100 MB to 101 MB will point to page ID 120 and will be serviced off the data held in that page. As this data is read off by the application, the page in the cache is freed up, and an IO for (100+16+128+256)MB is issued to refill the cache. Similarly, page 203 is filled with data from the file, from offset 200 to 201 MB. When the application requests the read on this offset, the index reports page 203 on the remote node.

Here, the filesystem transparently requests the remote RA cache 714 to return the data corresponding to the page. As the data is being copied in the application buffers, an internal read at offset (200+16+128+256)MB will be issued and will hosted in the remote memory once the I/O completes. This process will continue until the system chooses to stop the advanced prefetch routine, or the end of the file is reached.

In case of errors, where the remote system is inaccessible, this prefetching technique will suspend transparently, and a fresh I/O will be issued at the disk subsystem. Furthermore, can be used checksums to protect against memory corruptions. The network transport latency in a high availability system for this process will be on the order of a few microseconds, which is at least some orders of magnitude better than reading from a disk, as for a regular filesystem lookup.

Embodiments are thus described for a method to use filesystem redirection and remote memory to improve the restore performance. As shown in FIG. 7, embodiments of the high availability environment thus use the fast interconnect 703 and the resources available on the remote node 704. Embodiments are not so limited, however, and any similar distributed or multi-node system can be used, such as any collaborating filesystem cluster. Such embodiments should feature low latency reads from the remote node (e.g., limited to a few milliseconds) to reduce any impact of remote accesses on the restore performance.

Embodiments of the processes and techniques described above can be implemented on any appropriate backup system operating environment or filesystem, or network server system. Such embodiments may include other or alternative data structures or definitions as needed or appropriate.

Figure 9:
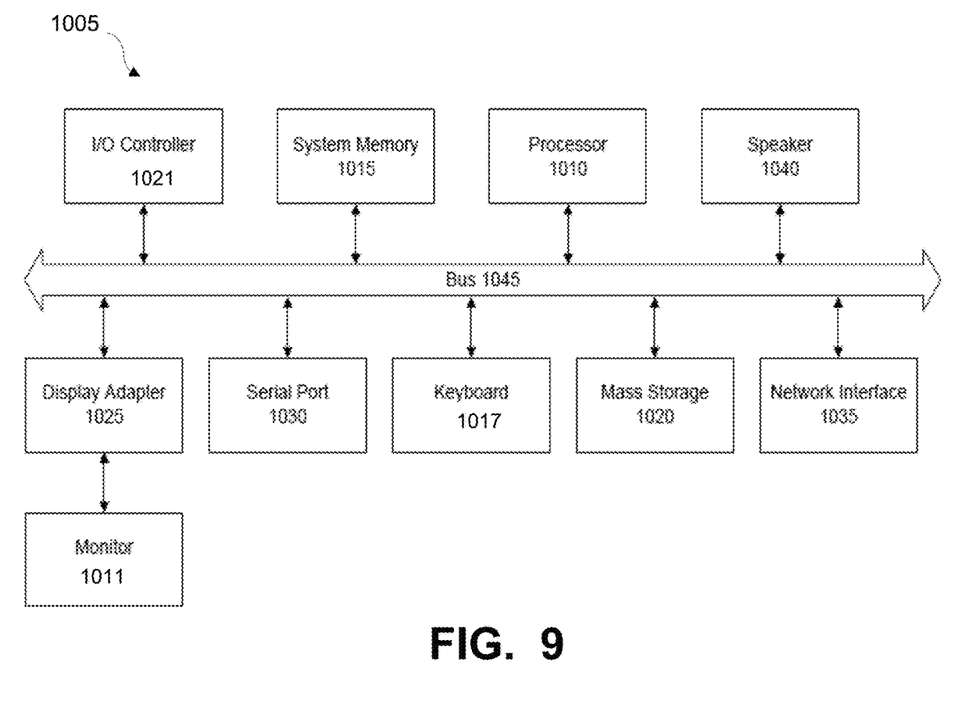
FIG. 9 is a system block diagram of a computer system used to execute one or more software components of the filesystem redirection-based prefetch process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of restoring files in a data backup system, comprising:
   receiving a restore request;
   determining that the received restore request comprises a long sequential read and not small file-level restores;
   setting up a local read-ahead cache on an active node and a remote read-ahead cache on a passive node coupled to the active node through a fast interconnect link;
   defining an index relating a file offset to memory storing file data and containing an indication of a location of the memory as stored locally or remotely;
   receiving a prefetch request to aid retrieval of file data restored from a storage system, wherein the prefetch request issues after a read request and comprises a prefetch request issued at a prefetch horizon on the order of megabytes in size from a read offset, and wherein the prefetch horizon covers an amount of time between stalls of input/output (I/O) operations of reads from the memory and slower reads from disk, and wherein the time between the stalls comprises a read highway;
   first determining if the read request accesses data contained in the index, and second determining if the indexed data is stored locally or remotely; and
   accessing the read data from the local read-ahead cache if stored locally or accessing the read data from the remote cache if stored remotely to effectively lengthen the read highway to thereby reduce the stalls of I/O operations.

2. The computer-implemented method of claim 1 wherein prior to first determining if the read request accesses data contained in the index, determining that the file data is of a size exceeding a minimum size threshold.

3. The computer-implemented method of claim 2 wherein prior to first determining if the read request accesses data contained in the index, determining that the read request accesses the file data in a minimally sequential access pattern.

4. The computer-implemented method of claim 1 wherein each of the local read-ahead cache and the remote read-ahead cache comprises a pool of pages that are uniquely addressable.

5. The computer-implemented method of claim 4 wherein the pages of the pool are used to track memory pool in a filesystem of the storage system.

6. The computer-implemented method of claim 5 wherein the index comprises a hash table storing a relationship of a file offset to a page number for the file being read by the read request.

7. The computer-implemented method of claim 1 wherein the prefetch request prefetches at least some data of the file into a system read-ahead cache comprising both the local and remote read-ahead caches.

8. The computer-implemented method of claim 7 wherein the prefetch request comprises a prefetch operation including a hint to the filesystem allowing lower layers of the filesystem stack to read-ahead the portion of the file stored in the system read-ahead cache.

9. The computer-implemented method of claim 8 wherein the restore process is implemented using a Multi-Streamed Restore (MSR) process that opens up a plurality of internal streams for the read operation and uses the system read ahead cache to serve user the I/O operations.

10. The computer-implemented method of claim 9 wherein the storage system comprises part of a deduplication backup process executed by a data storage server running a Data Domain File System (DDFS).

* * * * *